(No Model.)
H. C. LOWRIE.
ROD JOINT OR COUPLING.
No. 317,155. Patented May 5, 1885.
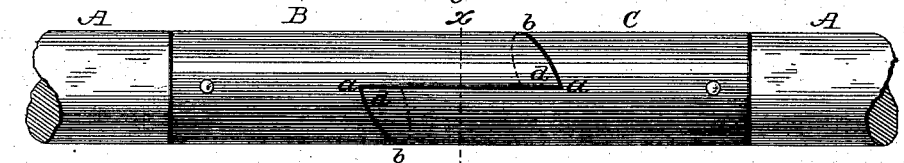
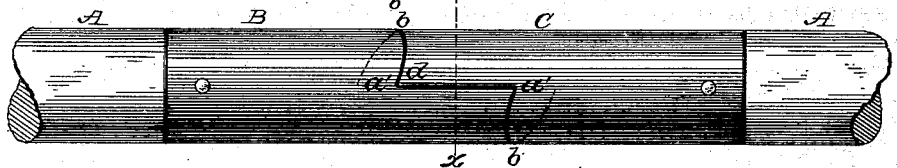
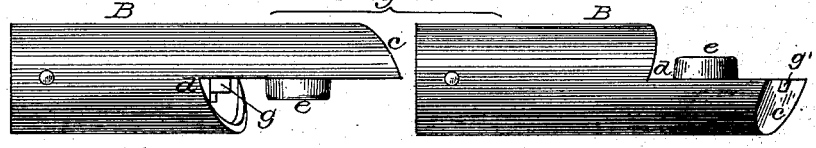
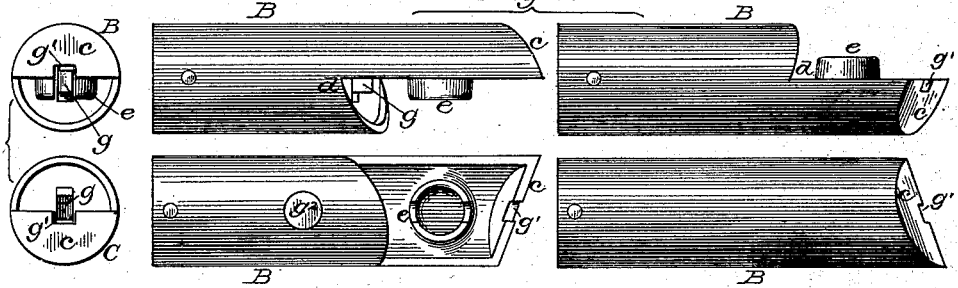
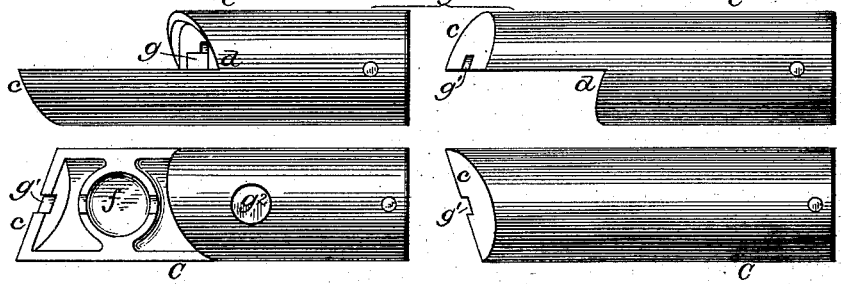
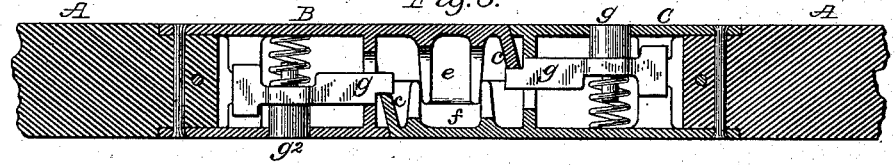
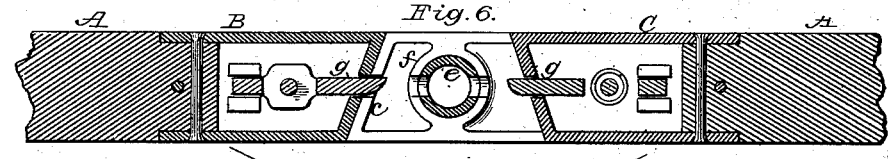
Attest:
Philip F. Larner.
Howell Bartle.
Inventor:
Harvey C. Lowrie
By Wm. C. Wood
Attorney.

UNITED STATES PATENT OFFICE.

HARVEY C. LOWRIE, OF DENVER, COLORADO.

ROD JOINT OR COUPLING.

SPECIFICATION forming part of Letters Patent No. 317,155, dated May 5, 1885.

Application filed September 10, 1884. (No model.)

*To all whom it may concern:*

Be it known that I, HARVEY C. LOWRIE, of Denver, in the county of Arapahoe and State of Colorado, have invented certain new and useful Improvements in Rod Joints or Couplings; and I do hereby declare that the following specification, taken in connection with the drawings furnished and forming a part of the same, is a clear, true, and complete description of the several features of my invention.

The desirability of a rod joint or coupling by which many wooden or metal sections can be joined end for end, so as to afford a rod, pole, or handle of great length, is widely recognized.

The object of my invention is to provide in such a joint a capacity for ready connection and disconnection for successfully resisting longitudinal and lateral strains, and especially for resisting rotative or torsional strains.

My novel rod joints or couplings are of value for general service, although I have specially devised them for use in connection with clearing out small sewers or drain-pipes, and for earth-augers, whether for boring vertically or laterally, all of which operations involve heavy torsional strains, because of the necessary rotation of the tools to which such jointed rods are to be secured after the manner of handles.

For ordinary service the rod-sections are composed of wood, in which case my joints involve sockets or ferrules for the reception of the ends of the rod-sections; but if said sections be of metal they can be integrally provided with the main parts of the joints or couplings.

A rod joint or coupling embodying my improvements in their best form is composed of metal in two main parts, and tubular, and said parts are halved together in peculiar and novel lines. At one side of the joint there is a longitudinal line, and diametrically opposite a similar shorter line of division, and these two lines are connected at each end by spiral lines, one on each side of the joint, and each spiral line extends half-way around the coupling, so that the outer ends of each of the parts which are to be interlocked are inclined outwardly in two directions. As a result of thus halving the parts of the coupling together, the joint or coupling is specially adapted to successfully resist heavy rotative or torsional strains. The abutments afforded by the ends of the parts provide for thrusting strains. The unequal length of the longitudinal lines provides for the resistance to lateral strains on one side. The "undercut" incident to the spiral-line ends of the parts provides for resistance to lateral strains on two sides of the joint, and for providing against other lateral strains, as well as longitudinal or tensile strains, I employ an interior diametrical socket and stud, and for locking the parts together I employ one or two latches or bolts, which occupy keepers formed in the ends of each half or part of the joint or coupling, and for rendering said latches accessible to manipulation they are provided with exposed thumb-pieces.

To more particularly describe my invention, I will refer to the accompanying drawings, in which Figure 1 in two views represents two opposite sides of one of my joints or couplings as applied to two wooden rod-sections. Fig. 2 in two end views illustrates the two members of the coupling, as when disjointed. Fig. 3 in four side views illustrates what may be termed the "male" member of the joint or coupling. Fig. 4 in four corresponding views illustrates what may be termed the "female" member of said coupling. Figs. 5 and 6 are longitudinal central sections of both of said members in their locked condition. Fig. 7 illustrates the position in which the two parts or members of the coupling are placed preparatory to their being locked.

In each instance, A denotes a portion of a wooden rod-section, and when such are used the two members of the coupling are tubular at their inner ends to serve as sockets or ferrules, and they are firmly secured to the rod-sections by screws, pins, bolts, or other suitable means. The coupling or joint is tubular, and its two members are halved together on the longitudinal lines $a$ $a'$, Fig. 1, that on one side of the coupling, as at $a$, being considerably longer than that on the other, as at $a'$, as clearly indicated, and each line on each side extends both ways equally from the same central point, as indicated by the dotted line $x$, Fig. 1, so that the oppositely-located connecting-lines $b$ are oppositely spiraled, as clearly shown. The male member B and the female member C, by reason of these peculiar lines employed in halving them together, have each an end, c, which is semicircular in outline, as seen in Fig. 2, and both of them are inclined forwardly in two directions, or, in other words, in two diametrical lines, as will be readily understood from the several views in Figs. 3 and 4. It will also be seen from the several figures that both members at d are undercut or beveled inwardly, so as to receive the forwardly-projected angular or inclined ends c, this in one sense forming a dovetailed union at that portion of the joint or coupling. It will also be seen that the spiral lines b are oppositely spiraled, as indicated by the difference in the length of the longitudinal lines a, (clearly shown in Fig. 1,) and that a second dovetailed union is formed, so that both together contribute largely to the capacity of the joint or coupling for resisting crosswise or lateral strain in diametrically-opposite directions, and also that the peculiar abutting contact of the several surfaces is such as to enable the coupling to withstand heavy torsional or twisting strains, and so that if no more than a mere cord were tied around a coupling formed as thus far described, great torsional strength and considerable lateral would be afforded, although it would be totally deficient as to tensile strength, and this latter I provide for by the employment, on the male member B, of an internal lateral stud, e, and for its reception a lateral socket, f, on the coincident side of the female member C, so that when said stud is seated in its socket the two members are longitudinally connected. I prefer that this stud be tapered and the socket correspondingly formed to receive it. Said stud and socket also contribute to torsional strength by co-operating efficiently with the peculiar dovetailed unions before referred to.

As thus far described, if no more than a cord were used, as before suggested, the joint or coupling would resist strains applied in every direction but one, and that would be a lateral strain from pressure applied to either rod-section on the side at which the line a is located, as seen in Fig. 1. Now, for protecting against strain in this last-named direction, as well as for providing a convenient and reliable means for connecting and disconnecting the members, one or two bolts are employed. As here shown, each member has an internal latch or bolt, g, which may be variably constructed and arranged without departure from certain portions of my invention, it being wholly immaterial how it may be organized, provided it cannot interfere with the placing of the members in proper position for union, and can have its head entered into its proper keeper or notch, $g'$, formed in the end c of the member with which it is to engage, and also provided said bolt be accessible for manipulation either for unlocking or locking, or both. As here shown, said latch or bolt g moves in guides on the interior of the shell of the coupling, and has a spiral spring for maintaining it in its locked position, and a push-button, $g^2$, which extends through a hole in said shell, so as to be accessible for manipulation. This bolt-head has an inclined or latch face on one edge, so that when the two members are placed crosswise of each other, as shown in Fig. 7, and with the stud e in its socket f, and are then swung into line, the stud then serving as a pivot, the bolt will be self-acting, and its head will pass freely into its keeper.

While I prefer the spring latch-bolt to be thus self-operating, it is obvious that if the latch-face be omitted the bolt will only require depression by way of its push-button, and also that said bolt, if made to slide longitudinally, would perform the same locking function, and that it could be provided with a thumb-stud projecting into a longitudinal slot in the shell in a manner well known, to enable it to be easily manipulated, and it is to be understood that these details may be largely varied without departure from certain features of my invention.

It will be obvious that the stud and socket, although best suited for all of the purposes indicated, may be dispensed with and simple lateral studs employed in lieu thereof, which, by engagement with each other, would provide for tensile strength in the coupling.

Having thus described my invention, I claim as new and desire to secure by Letters Patent—

1. The combination, in a rod joint or coupling, of two members halved together in longitudinal and in oppositely-spiraled lines, substantially as and for the purposes specified.

2. The combination, in a rod joint or coupling, of two members halved together in longitudinal and spiral lines, and provided with an internal lateral stud and socket, substantially as described.

3. The combination, in a rod joint or coupling, of two members halved together in longitudinal and spiral lines, the internal stud and its socket, and one or two bolts, substantially as described, for locking said members together.

4. The combination, in a rod joint or coupling, of the two members halved together in longitudinal and spiral lines, the internal stud and its socket, and a spring-bolt provided with a push-button, substantially as described.

HARVEY C. LOWRIE.

Witnesses:
ANDREW RYAN,
J. S. LITTELL.